(12) United States Patent
Cox et al.

(10) Patent No.: US 8,342,691 B2
(45) Date of Patent: Jan. 1, 2013

(54) INFORMATION TECHNOLOGY SYSTEM WITH MICRO PROJECTOR DISPLAY

(75) Inventors: Aaron R. Cox, Tucson, AZ (US);
Michael A. Curnalia, Tucson, AZ (US);
Christina M. Kokini, Oviedo, FL (US);
Leslie A. Velasco, Richmond, CA (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 12/699,774

(22) Filed: Feb. 3, 2010

(65) Prior Publication Data
US 2011/0187943 A1 Aug. 4, 2011

(51) Int. Cl.
*G03B 21/36* (2006.01)

(52) U.S. Cl. ........... 353/39; 353/74; 353/78; 353/79; 353/119; 353/122; 348/789

(58) Field of Classification Search ............ 353/30, 353/31, 39, 74, 78, 79, 119, 122; 372/38.09, 372/6, 24, 5, 7, 8, 9; 348/36, 789, E05.128
See application file for complete search history.

(56) References Cited

U.S. PATENT DOCUMENTS

| | | | |
|---|---|---|---|
| 3,710,194 A | | 1/1973 | Zammit et al. |
| 5,289,287 A * | | 2/1994 | Dargis et al. ............ 348/766 |
| 5,461,437 A | | 10/1995 | Tanaka et al. |
| 5,568,963 A * | | 10/1996 | Bennett et al. ............ 353/122 |
| 6,150,943 A | | 11/2000 | Lehman et al. |
| 6,367,934 B1 * | | 4/2002 | Salesky et al. ............ 353/74 |
| 6,594,078 B2 * | | 7/2003 | Clifton et al. ............ 359/449 |
| 6,637,896 B2 * | | 10/2003 | Li et al. ............ 353/119 |
| 6,806,850 B2 * | | 10/2004 | Chen ............ 345/7 |
| 6,909,543 B2 * | | 6/2005 | Lantz ............ 359/451 |
| 6,919,816 B2 | | 7/2005 | Dearborn et al. |
| 6,935,754 B2 * | | 8/2005 | Salvatori et al. ............ 353/119 |
| 6,964,481 B2 | | 11/2005 | Pho et al. |
| 7,320,520 B2 | | 1/2008 | Johnson |
| 7,329,008 B2 | | 2/2008 | Wittenberg |
| 7,385,359 B2 | | 6/2008 | Dowling et al. |
| 7,756,174 B2 * | | 7/2010 | Benner, Jr. ............ 372/38.09 |
| 7,980,704 B2 * | | 7/2011 | Kondo et al. ............ 353/79 |
| 2004/0017518 A1 * | | 1/2004 | Stern et al. ............ 348/744 |
| 2004/0119586 A1 | | 6/2004 | Rowles |
| 2005/0168707 A1 * | | 8/2005 | Feldpausch et al. ............ 353/79 |
| 2006/0017887 A1 * | | 1/2006 | Jacobson et al. ............ 353/30 |
| 2007/0027561 A1 | | 2/2007 | Dirnfeldner |
| 2008/0043205 A1 | | 2/2008 | Lonn |
| 2008/0061985 A1 | | 3/2008 | Strzelczyk |
| 2008/0178916 A1 | | 7/2008 | Kedjierski |
| 2008/0247128 A1 | | 10/2008 | Khoo |
| 2009/0021702 A1 * | | 1/2009 | Cleland et al. ............ 353/58 |
| 2009/0027620 A1 * | | 1/2009 | Lin et al. ............ 353/15 |

* cited by examiner

*Primary Examiner* — Georgia Y Epps
*Assistant Examiner* — Sultan Chowdhury
(74) *Attorney, Agent, or Firm* — Matthew C. Zehrer

(57) ABSTRACT

An information technology system includes a micro projector display for displaying status, operating, troubleshooting, and location information. An image output from the micro projector display is viewable from outside the enclosure, for example on a cabinet door, an optional retractable projection screen included with the enclosure, or a floor, wall, or ceiling of a room, or other external surface. In some embodiments of the invention, a micro display projector is adapted for removable electrical and mechanical connection to one or more docking ports on the information technology system. In some embodiments of the invention, a projection direction for the micro projector display is selectable.

15 Claims, 5 Drawing Sheets

INFORMATION TECHNOLOGY SYSTEM WITH MICRO PROJECTOR DISPLAY

BACKGROUND OF THE INVENTION

1. Field of the Invention

The present invention relates to an apparatus and method for displaying information from an information technology system having a micro projector display.

2. Background Information

Information technology systems used in telecommunications or distributed mass storage applications, are often installed in large numbers in specialized facilities equipped with standardized equipment racks or cabinets, power distribution, network interfaces, and temperature-controlled airflow for cooling, for example. Enclosures used to support and protect information technology systems have steadily decreased in size in response to demands for lower facility cost, larger numbers of installed information utility systems per facility, and lower equipment cost. As enclosure size decreases, less space is available on the enclosure's front panel for displays, annunciators, indicators, and other devices used to indicate operating status, error conditions, and other information related to an associated information technology system. However, while enclosure sizes are decreasing, the complexity and performance of the information technology systems is increasing, along with an increased need to monitor performance parameters, reduce maintenance and repair costs, and respond rapidly to errors or fault conditions that could affect the quality of service provided by the information technology system.

Conventional direct-view display systems, such as computer monitors and video monitors using direct-view liquid crystal or light emitting diode screens, are often too large to fit on the front panel of the enclosure of an information technology system, or too small for comfortable viewing of complex information such as diagrams, lengthy repair instructions, instructional videos, and so on. Therefore, there exists a need in the art for an information technology system, especially an information technology system in an enclosure with a front panel having a relatively small height dimension, to be able to present complex images that may include text, graphics, and/or video, without reducing space available inside the enclosure for subsystems related to the primary function of the information technology system. There also exists a need to display information that will aid in rapidly locating a particular information technology system from among a large number of information technology systems operating in close proximity.

SUMMARY OF THE INVENTION

The foregoing problems are solved and an advance in the art is obtained by a novel an information technology system that includes a micro projector display for displaying status, operating, troubleshooting, and location information. In one embodiment, an apparatus comprising an information technology system comprising an enclosure and a micro projector display attached to the enclosure.

In another embodiment, a method comprising the steps of adapting an information technology system enclosure to hold a micro projector display so that images output by the micro projector display are visible from outside the enclosure. Then inputting information related to an operating condition of the information technology system into the micro projector display. Then directing an image projected from the micro projector display onto a selected projection surface.

In another embodiment, an apparatus comprising an information technology system comprising an enclosure with a front panel. A micro projector display is rotatably attached to the front panel. The micro projector display is adapted to project an image containing information related to a status condition of the information technology system and a direction of projection is selectable by rotating the micro projector display.

DESCRIPTION OF THE PREFERRED EMBODIMENTS

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

An embodiment of the invention comprises an information technology system having an enclosure with a front panel, a rear panel, and a cover, in which a plurality of optional functional modules may be removably installed. The enclosure for the information technology system is adapted to provide mechanical support for and electrical connections to a micro projector display, also known in the art as a pico projector. The micro projector display included with an embodiment of the invention is adapted to display information related to one or more information technology systems. An information technology system in accord with an embodiment of the invention is advantageous for presenting complex images in a selected location for convenient viewing. Projected images may optionally be projected at a size that is sufficient for simultaneous viewing by more than one person. Furthermore, an information technology system in accord with an embodiment of the invention is capable of presenting complex images from an enclosure that is no larger than prior art systems which do not include this capability. By providing complex information directly from the information technology system, training, operating, and maintenance expenses may be reduced, and safety hazards may be avoided.

In IT environments, many individual information technology systems may be mounted together in one or more racks or enclosures. It may be difficult for a person to see status information about a particular information technology system without closely approaching the system's front panel. It is sometimes difficult to determine which information technology system may be having a problem. Furthermore, displays on information technology systems known in the art are generally limited to status indicator lights or simple alphanumeric indicators that present information in the form of short error codes or status codes. These codes must be interpreted by a person to determine the nature of the information being displayed. A person who is unfamiliar with a particular information technology system may have difficulty in interpreting status indicator lights or alphanumeric codes.

Figure 1:
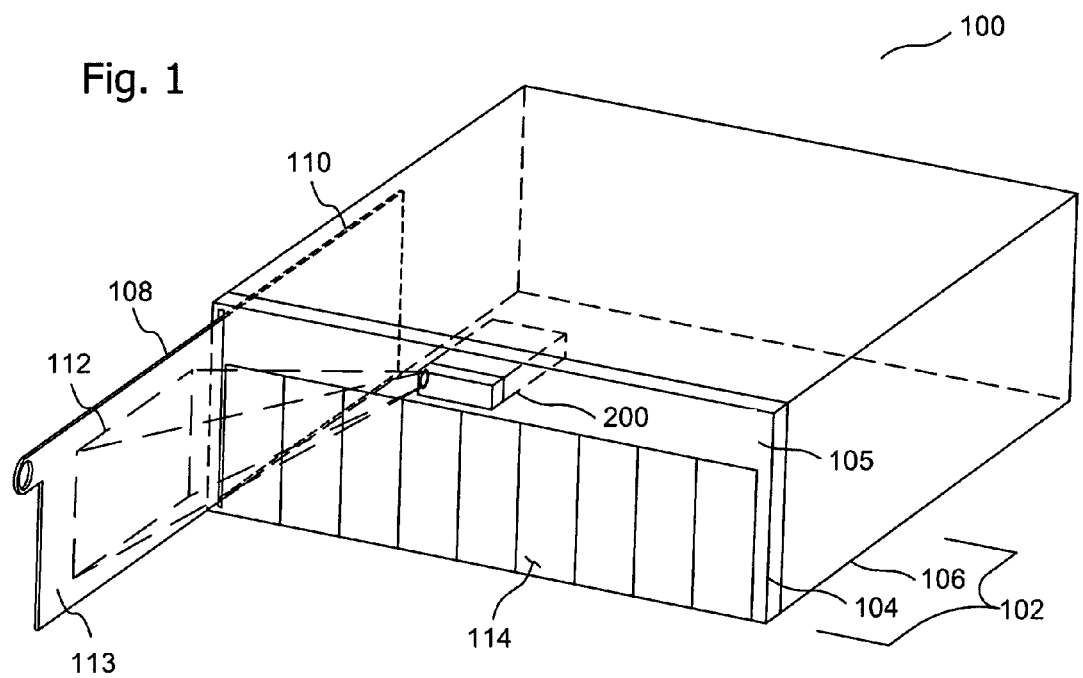
FIG. 1 is a pictorial view of an example of an information technology system having a micro projector display and an optional retractable projection screen in accordance with the invention.

Embodiments of the invention are well suited to solving these problems by providing location, status, and other information that is easily viewable without closely approaching an information technology system. For example, some embodiments of the invention are adapted to project information onto a projection surface which may be monitored from a remote location, for example by a video camera pointed at the projection surface. Or, images may be projected at a convenient size for viewing from across a room, for example from an operator's work area. Embodiments of the invention may be used for projecting images containing information in any form compatible with conventional computer monitors and video displays, for example symbols or messages for locating a particular information technology system, error messages, status messages, photographs, graphical information, charts, video, text in selected colors and fonts, photographs, and so on. A person viewing such images may then take steps as required to address the information presented in a projected image. Referring to the drawing figures wherein like reference numerals indicate like components in all of the several views, FIG. 1 illustrates an embodiment of an information technology system 100. The information technology system 100 includes an enclosure 102 having a front panel 104 and a cover 106. The enclosure 102 optionally has dimensions and mounting features for installing the enclosure 102 in a standardized rack mounting system, such as a 19 inch (480 millimeter) rack system. A height dimension of the front panel 104 may optionally be a multiple of 1.75 inches (44.4 millimeters), such as a "6U" enclosure which has a front panel height dimension of about 10.5 inches (267 millimeters). The information technology system 100 is shown with a plurality of optional modules 114 installed. Exemplary modules 114 may include, power supplies, clock recovery units, serializers, deserializers, transceivers, input/output ports, hard disk drives, fans, and so on.

The information technology system 100 includes a micro projector display 200 installed in the enclosure 102 so that an optical output (shown in FIG. 2) from the micro projector display may project an image 112 onto a surface outside the enclosure 102. The information technology system 100 is shown with an optional retractable projection screen 108 which may be retracted into a stowage area 110 when the projection screen 108 is not in use. An exemplary projected image 112 from the micro projector display 200 is represented in outline by dashed lines on a surface 113 of the optional projection screen 108.

In alternative embodiments of the enclosure 102, the micro projector display 200 may be located in a different position than shown in FIG. 1. For example, the micro projector display 200 may be located in a position selected for displaying an image on a screen on the right side of the enclosure 102 or for displaying an image on a floor, ceiling, another piece of equipment nearby, a portable projection screen, or from a position on a rear panel of the enclosure 102. Although a direction of projection approximately parallel to the outer surface of the front panel 104 is shown, the micro projector display 200 may alternatively be arranged to project images at other angles, for example projecting images in a direction approximately perpendicular to the front panel 104.

Figure 2:
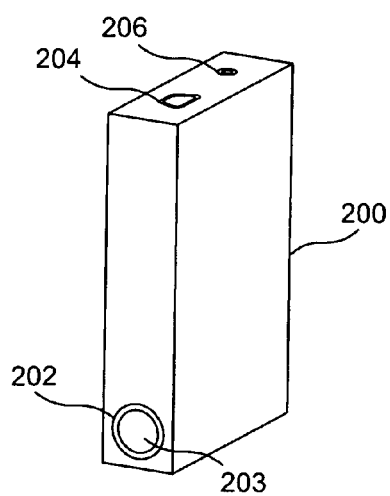
FIG. 2 is a pictorial view of an example of a micro projector display.

FIG. 2 illustrates an exemplary micro projector display 200. The micro projector display 200 has an optical output 202 comprising a projection lens 203 on a side of the display 200. Alternatively, the micro projector display 200 may have an optical output 202 on another side or on an end thereof. The micro projector display 200 includes an electrical connector 204 for input and output of display data and control commands and another electrical connector 206 for supplying electrical power to the micro projector display 200. Electrical power for a micro projector display 200 may optionally be supplied by a power source within the information technology system 100, by one or more electrical batteries electrically connected to the micro projector display, or by a source of electrical power external to the information technology system 100.

In some embodiments of the invention 100, a micro projector display 200 is enclosed within its own small enclosure. In other embodiments, the micro projector display 200 is an open assembly of optical, electrical, and mechanical components sometimes referred to as a "display engine". In some embodiments, the micro projector display has outer dimensions of approximately 0.4 inch (10 millimeters) by 2.5 inches (60 millimeters) by 3.0 inches (70 millimeters), although micro projector displays other dimensions may optionally be used.

Figure 3:
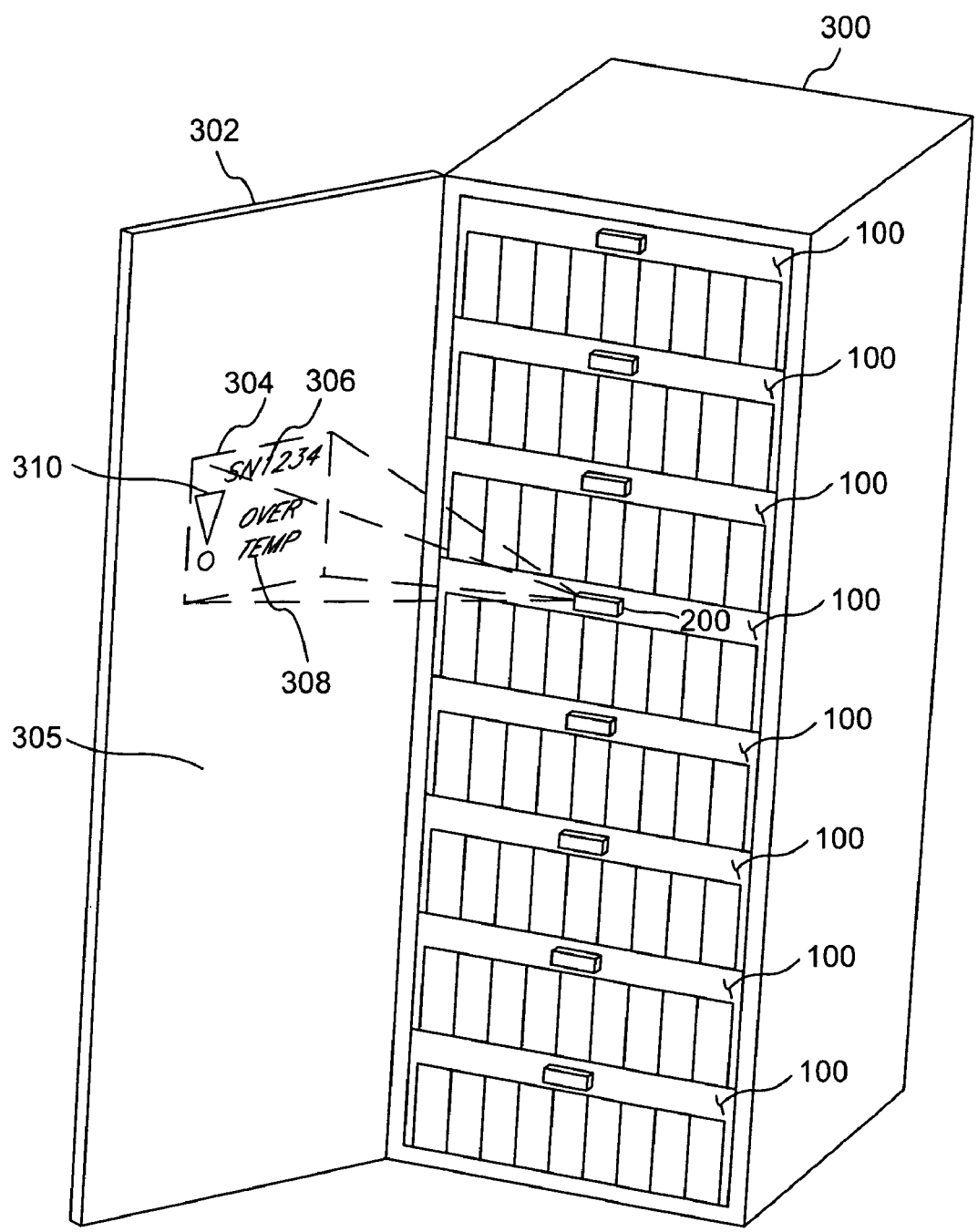
FIG. 3 is a pictorial view of an equipment cabinet with a door, showing the door in an open position and an example of an image displayed by one of a plurality of information technology systems installed in the equipment cabinet.

Referring to FIG. 3, it is common practice to install more than one information technology system in a common rack or cabinet. In the Figure, there is shown an example of eight information technology systems 100 installed in a cabinet 300 having a door 302 shown in an open position. A cabinet 300 or rack that may be capable of holding different numbers of systems other than shown in FIG. 3 may also be used. Information technology systems 100 may optionally be combined in a rack or cabinet with other kinds of systems, for example prior art systems which do not include the display capabilities described herein for embodiments of the invention.

FIG. 3 shows an example of an information display system 100 projecting an exemplary image 304 against a surface 305 of the door 302. In FIG. 3, the surface 305 of the door 302 is farther from the micro projector display 200 than the distance separating the projection screen 108 from the micro projector display 200 shown in FIG. 1, thus length and width dimensions of the projected image 304 are larger than the corresponding dimensions for the projected image 112 of FIG. 1. The difference in dimensions of the projected images is in proportion to the difference in separation distances between the micro projector displays and the projection surfaces. A size of projected image from an embodiment of the invention may therefore be selected by choosing a separation distance between the micro projector display and a projection surface. Also, although FIG. 3 shows an image 304 projected from one information technology system 100, images from more than one information technology system 100 may optionally be projected and viewed simultaneously. The images from separate information technology systems 100 may optionally include different information in each image.

The exemplary image 304 is representative of many alternative images which may optionally be projected from an embodiment of the invention. The exemplary projected image 304 may include optional identifying information 306 related to a particular information technology system 100, for example, a serial number, a network name, or other selected identifying information. Other examples of information which may optionally be included in a projected image 304 are represented by a message 308 "OVER TEMP" and may include, but are not limited to, operating instructions for the information technology system 100, repair instructions, information for rapidly locating a particular information technology system, error codes, fault indicators such as a symbol 310, parameters related to performance of the information technology system, safety information, for example the location of hazardous voltages or currents or the location of moving parts or hot surfaces, measured values for parameters such as voltage, temperature, or current, derived values such as rate of communication, system specifications such as maximum rate of communication or storage capacity, or information received by the information technology system 100 from an external source for display by the micro projector display 200. Information in the projected image may optionally include information received from other information technology systems 100 or other equipment communicating with an information technology system 100.

Projected images, for example the projected image 304 in FIG. 3, may optionally include symbols, text, diagrams, schematics, photographs, or analog or digital video, individually or in any selected combination. An image may selectively be projected in response to an operating condition in the information technology system 100 or in another system in communication with the information technology system 100. For example, safety information may be displayed automatically when the enclosure cover 106 is removed from the enclosure 102. An image may also be projected in response to commands received by the information technology system 100 from an external system. For example, an alarm message may be displayed in the event of a safety hazard affecting the facility in which the information technology system 100 is installed.

Figure 4:
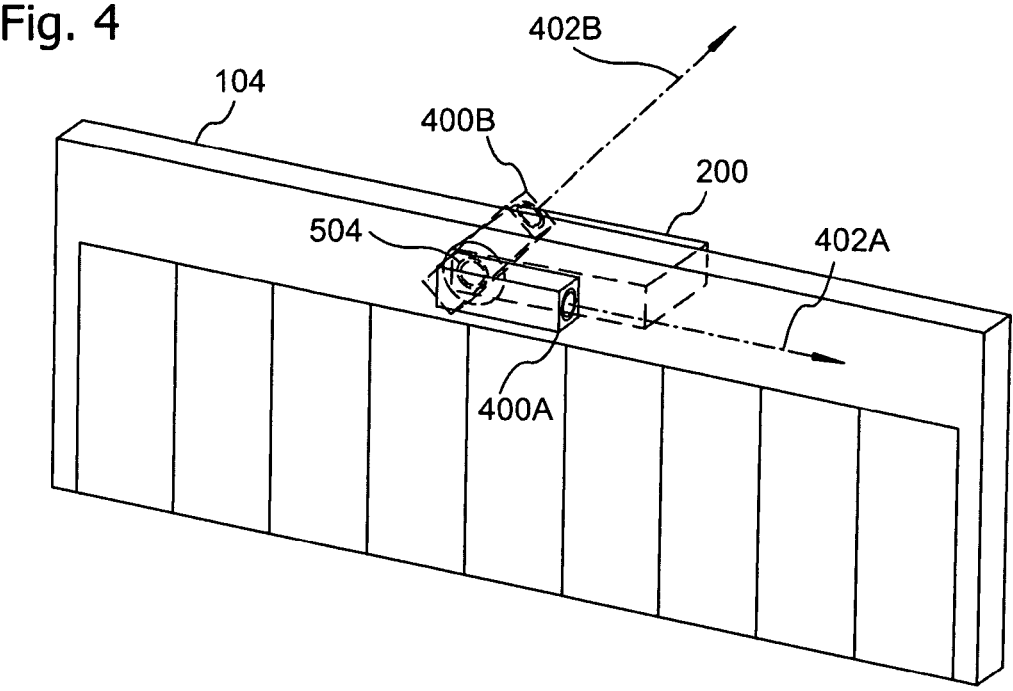
FIG. 4 is a pictorial view of a front panel from an enclosure for an information technology system, showing an example of an installed location for a micro projector display and further showing an optional beam steerer in two alternative positions for projecting an image from the micro projector display.

In some embodiments of the invention, a direction of projection of a displayed image is selectable. Referring to FIG. 4, a beam steerer 400A is optically coupled to an optical output of a micro projector display 200. A direction of projection 402A may be selected by rotating the beam steerer 400A about a rotational coupling 504 connecting the beam steerer to the front panel 104 of an enclosure (other parts of the enclosure omitted in FIG. 4). As shown in the Figure, the beam steerer 400A is in a first selected position for projecting an image in a first selected direction 402A, and a second selected position of the beam steerer 400B, the second position of the beam steerer marked with dashed lines, for projecting an image in a second selected direction 402B. A beam steerer suitable for use with an embodiment of the invention optionally includes one or more mirrors or prisms in a housing. Alternatively, a beam steerer may comprise a coherent fiber optic bundle for image transmission or a base fixed to the front panel 104 with one or more mirrors movable in azimuth and elevation coupled to the base.

Figure 5:
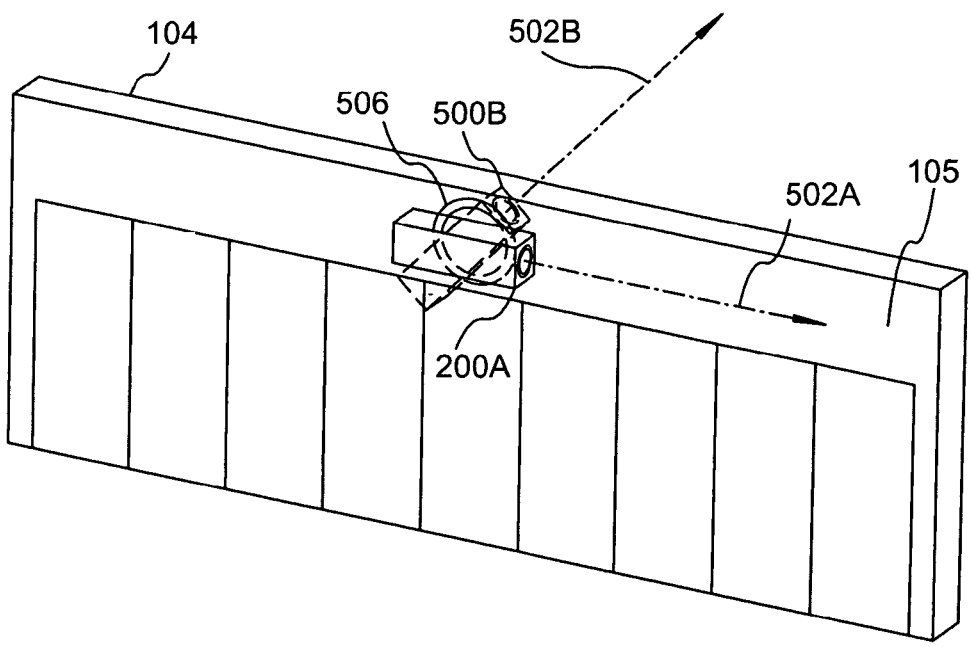
FIG. 5 is a pictorial view of a front panel of an enclosure for an alternative embodiment of an information technology system having a small micro projector display rotatably coupled to the outside of the enclosure's front panel.

Referring to FIG. 5, the information technology system 100 includes an alternative embodiment of a small micro projector display 200A rotatably coupled to an external surface 105 of the system's enclosure. The alternative embodiment of the micro projector display 200A is shown in two of many selectable positions on the front panel 104 of the enclosure 102 (other parts of the enclosure omitted in FIG. 5). In a first example of a selectable position, a micro projector display 200A attached to a rotational coupling 506 that is mounted to the external surface 105 of the front panel 104. The micro projector display 200A is positioned to project an image in a first selected direction 502A. The micro projector display 200A may be turned by rotating it about the rotational coupling 506. A second example of a selected position 500B is marked for the micro projector display, marked with dashed lines, for projecting an image in a second selected direction 502B. Embodiments adapted for selectable direction of projection, as in FIGS. 4 and 5, may be used for projecting an image against a cabinet door 302 (shown in FIG. 3), where the cabinet door may be hinged on either the left side or right side of the cabinet, or against another selected projection surface, such as a floor or ceiling of a room in which the information technology system is located.

Figure 6:
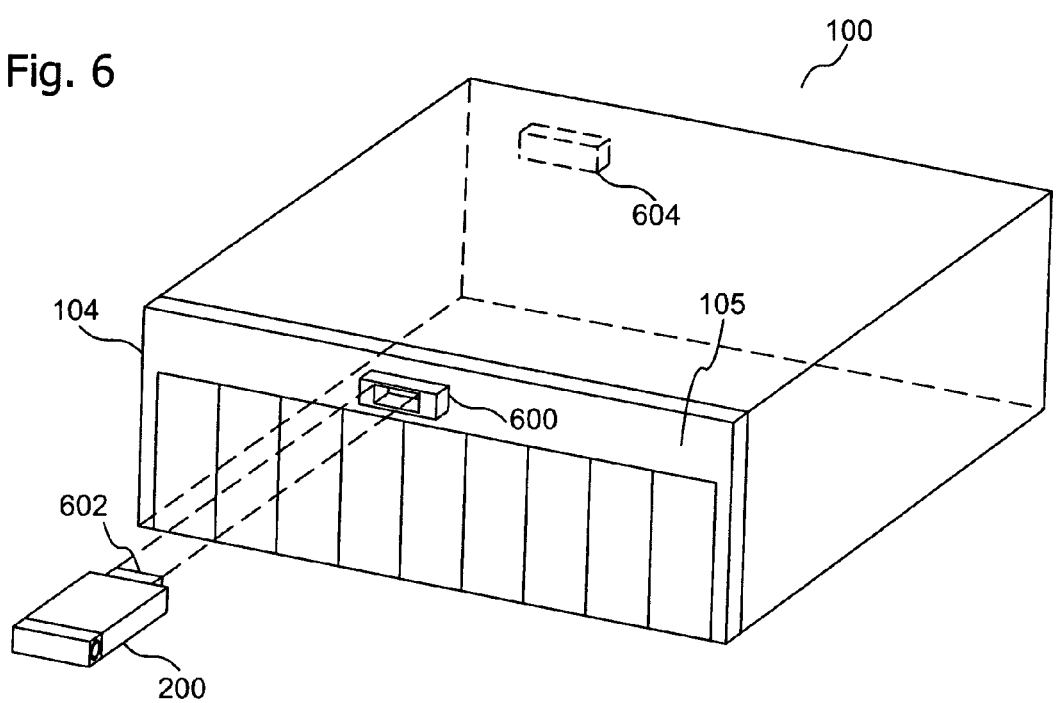
FIG. 6 is a pictorial view of another alternative embodiment of an information technology system having a docking connector for removable connection of a micro projector display, and further showing an example of a micro projector display having a connector compatible with the docking connector.

An embodiment of the invention includes at least one docking connector for removably connecting the micro projector display 200. In the example of FIG. 6, a first docking connector 600 is attached to the external surface 105 of the front panel 104 of the information technology system 100. A second, optional docking connector 604 is shown attached to a back panel of the enclosure. The micro projector display 200 includes a connector 602 mechanically and electrically compatible with the docking connectors (600, 604) on the information technology system 100. A micro projector display 200 may optionally be shared among several information technology systems 100 equipped with docking connectors. Also, by including more than one docking connector on an information technology system 100, a projection location and direction for a displayed image are selectable.

Figure 7:
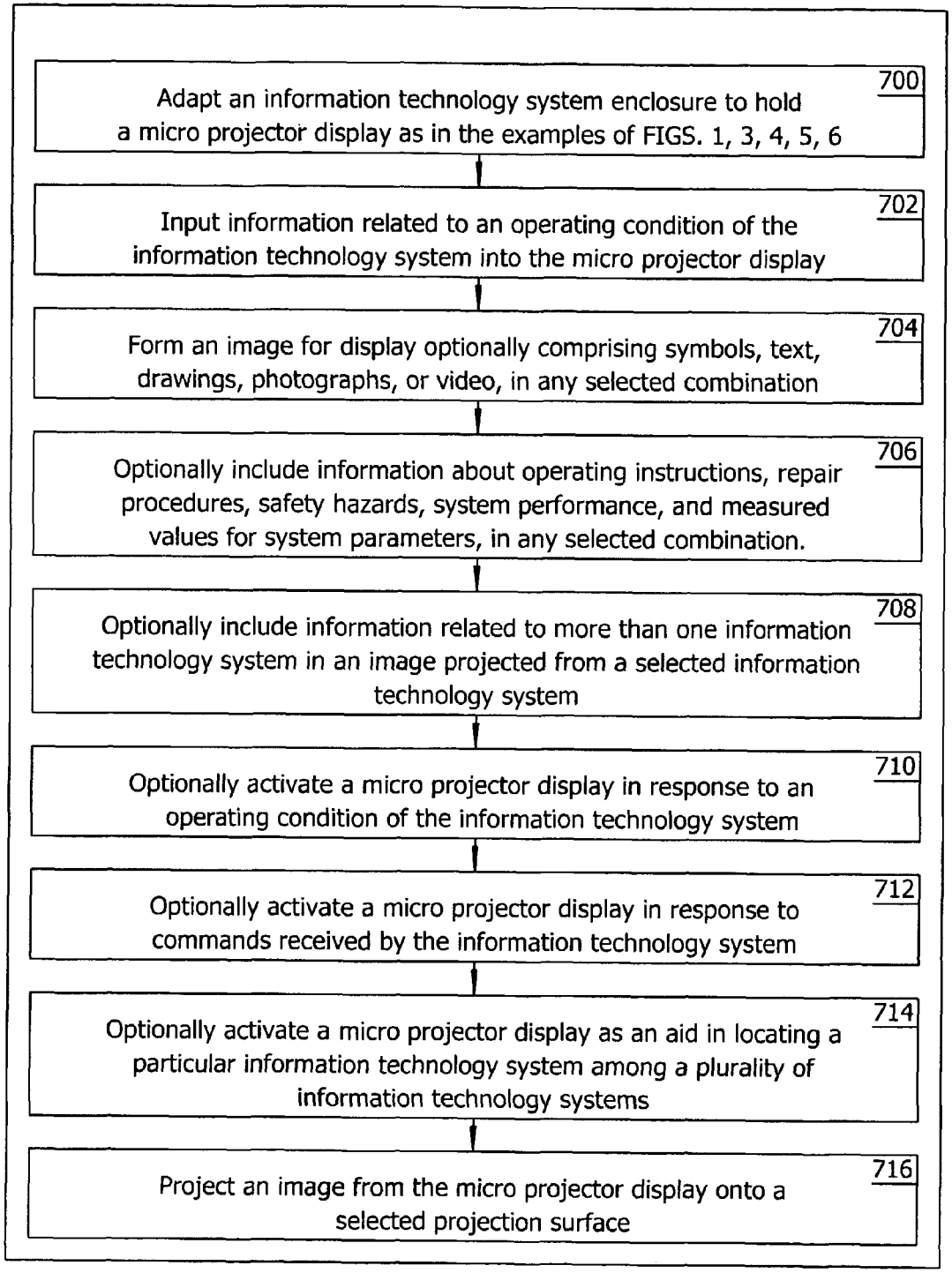
FIG. 7 is a diagram of steps in a method in accord with an embodiment of the invention.

Some embodiments of the invention comprise steps in a method for displaying information related to an information technology system. An example of a method in accord with an embodiment of the invention is illustrated in FIG. 7. The example of a method begins with step 700, adapting an information technology system enclosure to hold a micro projector display, as explained in relation to FIGS. 1, 3, 4, 5, and 6. In step 702, information related to an operating condition of the information technology system is input into the micro projector display.

In step 704, an image is formed for display, the image optionally comprising symbols, text, drawings, photographs, or video, in any selected combination.

In step 706, information about operating instructions, repair procedures, safety hazards, system performance, or measured system parameters, in any selected combination, are optionally included in the image for display.

In step 708, information related to more than one information technology system is optionally included in an image projected from a selected information technology system.

In step 710, a micro projector display is optionally activated in response to an operating condition of the information technology system.

In step 712, a micro projector display is optionally activated in response to commands received by the information technology system.

In step 714, a micro projector display is optionally activated as an aid in locating a particular information technology system among a plurality of information technology systems.

In step 716, an image is projected from the micro projector display onto a selected projection surface.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An apparatus comprising:
an information technology system comprising an enclosure;
a micro projector display attached to said enclosure, wherein said micro projector display is adapted to receive data representative of information to be displayed from said information technology system and to project information to be displayed onto a selected projection surface; and
one or more of:
a projection surface being a panel extendable from and retractable into an interior of said enclosure through a slot of said enclosure between a first position in which said projection surface is positioned within said enclosure and a second position in which said projection surface is largely positioned outside said enclosure, such that in said second position but not in said first position said projection surface is to display an image projected from said micro projector display;
a door coupled to said enclosure and movable between an open position in which electronic components of said information technology system are accessible and a closed position in which said electronic components are inaccessible, such that in said open position an interior surface of said door is to display said image projected from said micro projector display;
a docking connector attached to an exterior of said enclosure to electrically and mechanically couple said micro projector display such that said micro projector display is attachable to and removable from said enclosure without having to open said enclosure.

2. The apparatus of claim 1, comprising said projection surface.

3. The apparatus of claim 1, wherein said enclosure further comprises a front panel and said micro projector display is attached to said enclosure so as to project an image away from said front panel.

4. The apparatus of claim 1, comprising said door.

5. The apparatus of claim 1, further comprising a beam steerer optically coupled to said micro projector display, wherein a direction for projecting an image from said micro display projector is selectable by adjustment of said beam steerer.

6. The apparatus of claim 1, comprising said docking connector.

7. The apparatus of claim 1, wherein said micro projector display is adapted to display an image related to a status condition of said information technology system.

8. The apparatus of claim 7, wherein said micro projector display is adapted to project an image for indicating a location of said information technology system.

9. The apparatus of claim 7, wherein said micro projector display is adapted to project an image comprising operating instructions for said information technology system.

10. The apparatus of claim 7, wherein said micro projector display is adapted to project an image comprising instructions for repair of said information technology system.

11. The apparatus of claim 7, wherein said micro projector display is adapted to project a video image.

12. The apparatus of claim 7, wherein said micro projector display is adapted to project an image comprising safety information.

13. The apparatus of claim 7, wherein a size of an image projected from said micro projector display is selectable.

14. The apparatus of claim 7, wherein said micro projector display is adapted to display information from more than one information display system.

15. The apparatus of claim 7, wherein said micro projector display is adapted for control of projected images by commands received by said information display system.

* * * * *